Oct. 15, 1963
S. A. HENDERSON
3,106,835
CHECK VALVE TESTER
Filed Feb. 10, 1959
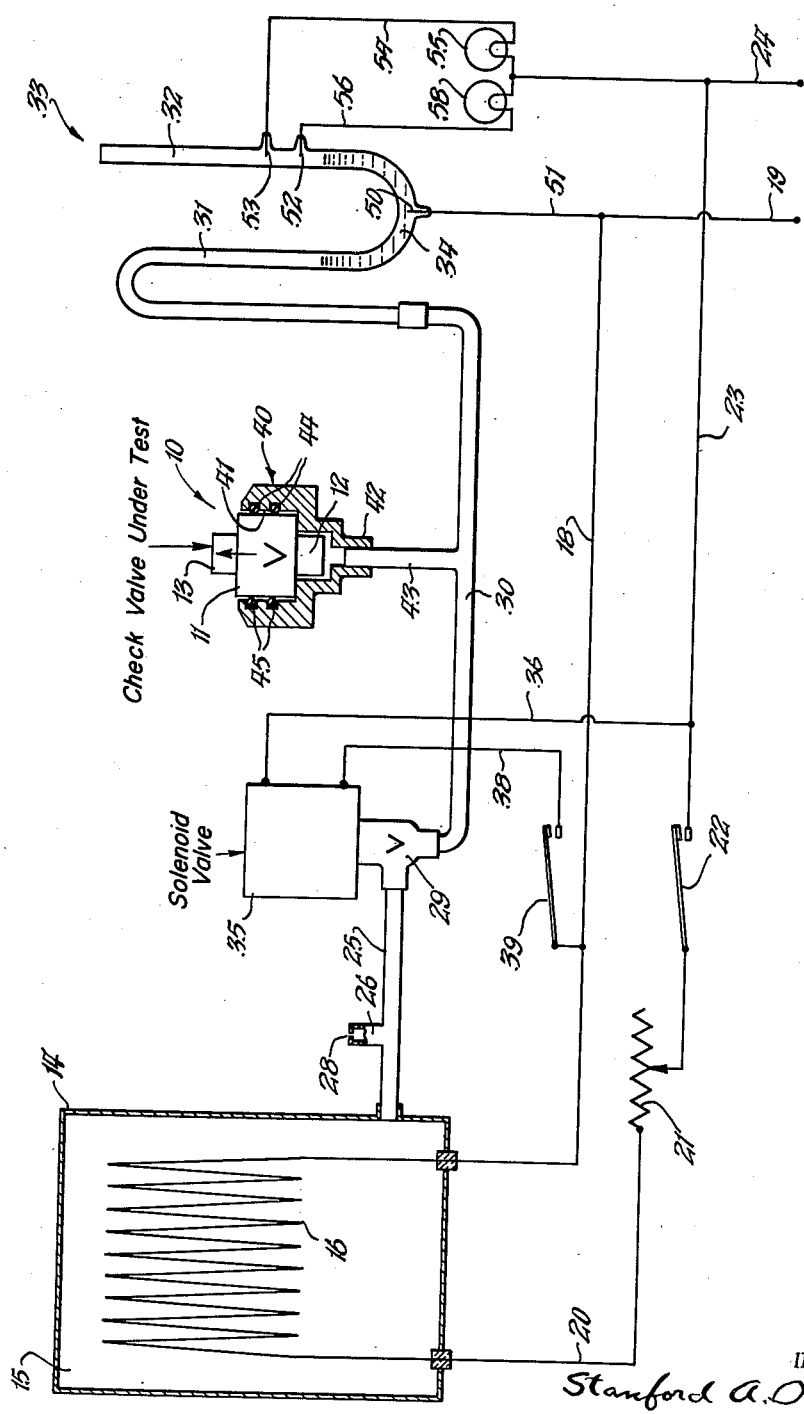
INVENTOR.
Stanford A. Henderson
BY
Popp and Sommer
Attorneys.

United States Patent Office 3,106,835
Patented Oct. 15, 1963

3,106,835
CHECK VALVE TESTER
Stanford A. Henderson, Snyder, N.Y., assignor to Gomco Surgical Manufacturing Corp., Buffalo, N.Y., a corporation of New York
Filed Feb. 10, 1959, Ser. No. 792,397
9 Claims. (Cl. 73—46)

This invention relates to a check valve tester and more particularly to such a tester which permits of adjusting a check valve, with a high degree of accuracy, to open within predetermined limits of maximum and minimum values of positive pressure. The apparatus also serves to test the check valve against any leakage when subjected to a negative pressure.

A check valve tester embodying the present invention was particularly designed for testing and permitting the proper adjustment of the two check valves used in the inlet and outlet of the thermotic pumps forming the subject of my Patents Numbers 2,346,841 dated April 18, 1944 and 2,465,685, dated March 29, 1949. Such pumps are used in conjunction with surgery and it is not only important that they function throughout the surgical operation and that they provide not only the exact value of suction required, but also that this suction be completely cut off at regular intervals. To this end, it is important that each of the two check valves in the air inlet and outlet of the patented thermotic pumps each open at a predetermined minimum positive pressure and, equally important, close against any leakage when a negative pressure of any value is impressed on the same.

It is accordingly an important object of the present invention to provide testing apparatus by the use of which a check valve can be adjusted to open between predetermined minimum and maximum values of positive pressure.

Another object of the invention is to provide such apparatus in which the minimum and maximum values are visually indicated, preferably by the use of two lights, one of which must be on and the other off when the check valve has been properly adjusted.

Another important object of the invention is to provide such apparatus in which following such adjustment and response to positive pressure, the apparatus can be immediately used to test the check valve against leakage under vacuum.

Another aim is to provide such apparatus in which the valve is tested under conditions closely paralleling operating conditions, a thermotic pump chamber generally conforming to the chambers shown in the said patents being used to supply both the positive and negative pressures used to check the valve.

Another purpose of the invention is to provide such apparatus in which check valves under test can be quickly and reliably attached to and removed from the apparatus.

Another important aim is to provide such apparatus which can be used to test check valves with a high degree of accuracy by an operator having little experience.

Another aim is to provide such apparatus in which the parts return, when the test controls are released, to the position for the start of a testing sequence, so that no special care is required to set up the apparatus for the next test.

Another aim is to provide such apparatus which has a fine adjustment to compensate for variations in line voltage, changing characteristics of the apparatus, or variations between different pieces of apparatus in their original manufacture, this adjustment not being used in the testing sequence, however.

Another object is to provide such apparatus which is rugged in construction and will stand up under conditions of severe and constant use without getting out of order or requiring repair.

Other objects and advantages of the invention will be apparent from the following description and drawing in which:

The FIGURE is a diagrammatic representation of a check valve tester apparatus embodying the present invention.

The apparatus forming the subject of the present invention is designed to test and permit adjustment of a check valve indicated generally at 10 to open within predetermined minimum and maximum values of positive pressure. Immediately following such adjustment of the check valve it is subjected to test under vacuum, against any leakage. This check valve is shown as having a cylindrical body 11 with an inlet 12 and outlet 13 at its opposite axial ends, the check valve opening in the direction of the arrow shown.

The check valves for which the testing apparatus was designed are used in the inlet and outlet of the working chamber of the thermotic pumps shown in my said patents, which check valves must open under comparatively low pressure differentials and also positively close under reverse pressure differentials, as well as supply pressure differentials closely approximating those encountered in actual service. The source of both positive and negative pressures for the check valve tester of the present invention is in the form of an enclosed casing 14 providing a working chamber 15 and containing an electrical resistance in the form of an electrical filament 16 of substantial length. One end of this filament is connected by a line 18 to side 19 of a main power line. The other terminal 20 is connected through a variable resistor 21, on and off switch 22 and line 23 with the other side 24 of the line. This variable resistor 21 is used for corrective purposes only, such as variations in line voltage, and variations in operating characteristics resulting from either variations in manufacture of different pieces of testing apparatus or changing characteristics during operation. This variable resistor is not used as a part of the testing sequence. The casing 14 has an air inlet and outlet line 25 having an air vent 26 provided with a restricted orifice 28, the latter being on the order of .010 inch in diameter for testing valves to be used with the patented structure. As will become apparent, casing 14 and vent 26 together form an intermittently operating pump. The pipe 25 connects with a normally open, on and off solenoid or otherwise electrically operated valve 29, the other side of which connects through a pipe 30 with one leg 31 of a U-shaped mercury manometer 33 the other leg of which, indicated at 32, is open at its upper end to the atmosphere. Solenoid 35 of valve 29 has one terminal connected by line 36 to the side 24 of the main power line, and its other terminal is connected through line 38 and a normally open, manually operated, off and on switch 39 with the other side 19 of the main powerline.

The valve 10 to be tested is inserted into a test socket indicated generally at 40. This socket is made of metal and is provided with a cylindrical bore 41, the upper end of which is open to the atmosphere and the inner end of which is connected through a neck 42 to a branch 43 in the pipe 30. The bore 41 is internally provided with a pair of annular grooves 44 containing O-rings 45 which are usually made of rubber or other soft resilient flexible material. The size of the O-rings 45 is proportioned so that the periphery of the cylindrical body 11 of the check valve is snugly sealed within rings 45 so that air cannot leak around the exterior of the valve.

The manometer 33 forming part of a gauge is provided at its bottom with a contact 50 which is permanently immersed in the body of mercury 34 and is connected by a line 51 with the side 19 of the main power line. The leg 32 of the manometer is provided with a pair of contacts 52 and 53 arranged one above the other and adapted to progressively contact the body 34 of mercury as it rises in the leg 32. The upper contact 53 is connected through line 54 and lamp 55 with the side 24 of the main power line, and the lower contact 52 is connected through line 56 and lamp 58 with the side 24 of the main power line, forming the remainder of the gauge.

In the use of the apparatus, a check valve 10 is inserted, inlet 12 first, into the bore 41 of the socket 40, and in doing so, the external surface of valve body 11 is sealed against leakage by the O-rings 45, which are placed under outward radial compression. The operator then closes the normally open switch 22 for approximately two seconds. This establishes a circuit from the side 24 of the line, line 23, closed manual switch 22, variable resistor 21, line 20, resistance heating filament 16, and line 18 to the other side 19 of the line. This energization of the filament 16 causes it to heat the air in the working chamber 15 of casing 14 and this heated air expands and flows out through the pipe 25, open solenoid valve 29, pipe 30, branch 43, and leg 31 of the manometer 33. A small amount of this air also escapes at a slow, measured rate through the orifice 28 of the vent 26. The resistance to this air flow caused both by the valve 10 under test and orifice 28 will move the body of mercury 34 differentially down in leg 31 and upwardly in leg 32 of manometer 33. The valve 10 under test is then adjusted so that the mercury 34 will rise in leg 32 high enough so that it engages the lower contact 52 but not high enough to engage upper contact 53. This causes the indicator light 58 to be illuminated, but leaves the indicator light 55 de-energized. In the event that the light 55 lights up, the operator knows that the resistance to air flow by the check valve 10 under test is too great and either makes an appropriate adjustment or rejects the valve.

During the two-second period of such adjustment in which the switch 22 remains closed, the air in the working chamber 15 comes to atmospheric pressure but is at an elevated temperature. This atmospheric pressure is achieved through escape of the expanded air both through the valve 10 under test and also through vent 26. This elevated temperature of the air in the working chamber 15 falls rapidly when switch 22 is opened, which is done at this time by the operator. The rapidly falling temperature of the air in the working chamber 15, caused by the dissipation of heat through the walls of casing 14, causes a reduction in pressure to a partial vacuum or negative pressure in the working chamber and in the air lines, which causes the body of mercury 34 to be drawn up into the leg 31 of the manometer and out of engagement with the test contact 52. The operator now closes normally open switch 39, thereby energizing solenoid 35 which is connected by this switch across the sides 19 and 24 of the main power line. The solenoid operated valve 29 is normally open, and hence energization of its solenoid 35 will cause this valve to close so that the mercury 34 will hold this new level indefinitely, if the valve 10 under test does not leak. Any change in the level of the mercury which would indicate leakage is, of course, observed by the operator, and in the event of leakage the valve under test is then established as being defective. While this test is being completed, the vent 26 allows ambient air to return to the working chamber 15 so that upon release of the switch 39, the parts are returned to the position shown in the drawing and ready for another test sequence, an untested check valve being substituted for the tested check valve 10 which is removed from the socket 40.

From the foregoing, it will be seen that the present invention provides a tester for check valves which has the advantages and accomplishes the purposes previously set forth.

What is claimed is:

1. A check valve tester comprising a socket having a recess for receiving the inlet end of a check valve under test and means in said recess forming an air tight seal with the exterior of said check valve, an air conduit extending from said recess in communication with said inlet end of said check valve, an air pump connected to one end of said conduit for applying positive air pressure through said conduit to open said check valve, said pump including a hollow casing forming a working chamber, means in said casing for heating and expanding the air in said chamber to produce said positive pressure in said conduit, and vent means connected to said casing and having a resistance orifice for slowly exhausting air to the atmosphere from said chamber under said positive pressure, and a gauge connected to said conduit for determining whether the opening pressure of said check valve under said positive pressure falls within predetermined minimum and maximum values relative to a standard reference pressure, said gauge including means movable in response to said positive pressure, means responsive to the movement of said movable means for indicating both said minimum and maximum values, and the outlet end of said check valve being open to said standard reference pressure.

2. A check valve tester comprising a socket having a recess for receiving the inlet end of a check valve under test and means in said recess forming an air tight seal with the exterior of said check valve, an air conduit extending from said recess in communication with said inlet end of said check valve, an air pump connected to one end of said conduit for applying negative air pressure through said conduit to close said check valve, said pump including a hollow casing forming a working chamber, means in said casing for cooling and contracting the air in said chamber to produce said negative pressure in said conduit, and vent means connected to said casing and having a resistance-orifice for slowly permitting atmospheric air to enter said chamber under said negative pressure, a normally open test valve connected to said conduit between said pump and check valve for closing said conduit to maintain said negative pressure therein, and a gauge connected to said conduit on the side of said test valve remote from said pump for indicating whether any air leaks through said check valve into said conduit under said negative pressure, said gauge including means movable in response to any decrease in said negative pressure.

3. A check valve tester comprising a socket having a recess for receiving the inlet end of a check valve under test and means in said recess forming an air tight seal with the exterior of said check valve, an air conduit extending from said recess in communication with said inlet end of said check valve, an air pump connected to one end of said conduit for sequentially applying positive and negative air pressure through said conduit to open said check valve under said positive pressure and to close said valve under said negative pressure, said pump including a hollow casing forming a working chamber, means in said casing for heating and expanding the air in said chamber to produce said positive pressure in said conduit and for cooling and contracting the air in said chamber to produce said negative pressure in said conduit, and vent means connected to said casing for exhausting air to the atmosphere from said chamber under said positive pressure and for permitting atmospheric air to enter said chamber under said negative pressure, a normally open test valve connected to said conduit between said pump and said check valve for closing said conduit to maintain said negative pressure therein, and a gauge connected to said conduit on the side of said test valve remote from said pump for indicating whether the resistance of said check valve to opening under said positive pressure falls within predetermined minimum and maximum values and whether any air leaks through said check valve into said conduit under said negative pressure, said gauge including means movable in response to said positive pressure and in response to any decrease in said negative pressure, and means responsive to the movement of said movable means under said positive pressure for indicating both said minimum and maximum values.

4. A check valve tester comprising a socket having a recess for receiving the inlet end of a check valve under test and means in said recess forming an air tight seal with the exterior of said check valve, an air conduit extending from said recess in communication with said inlet end of said check valve, an air pump connected to one end of said conduit for applying positive air pressure through said conduit to open said check valve, said pump including a hollow casing forming a working chamber, electrical resistance means in said casing and energizable for heating and expanding the air in said chamber to produce said positive pressure in said conduit, and a vent connected to said casing and having a resistance orifice for slowly exhausting air to the atmosphere from said chamber under said positive pressure, switch means for energizing said electrical resistance means, and a gauge connected to said conduit for determining whether the opening pressure of said check valve under said positive pressure falls within predetermined minimum and maximum values relative to a standard reference pressure, said gauge including means movable in response to said positive pressure, electrical means energizable in response to the movement of said movable means for indicating both said minimum and maximum values, and the outlet end of said check valve being open to said standard reference pressure.

5. A check valve tester comprising a socket having a recess for receiving the inlet end of a check valve under test and means in said recess forming an air tight seal with the exterior of said check valve, an air conduit extending from said recess in communication with said inlet end of said check valve, an air pump connected to one end of said conduit for applying negative air pressure through said conduit to close said check valve, said pump including a hollow casing forming a working chamber, electrical means in said casing and de-energizable for cooling and contracting the air in said chamber to produce said negative pressure in said conduit, and a vent connected to said casing through said conduit for permitting atmospheric air to enter said chamber under said negative pressure, a normally open and de-energized, electrically operated test valve connected to said conduit between said pump and check valve and energizable for closing said conduit to maintain said negative pressure therein, switch means for energizing said test valve, and a gauge connected to said conduit on the side of said test valve remote from said pump for indicating whether any air leaks through said check valve into said conduit under said negative pressure, said gauge including means movable in response to any decrease in said negative pressure.

6. A check valve tester comprising a socket having a recess for receiving the inlet end of a check valve under test and means in said recess forming an air tight seal with the exterior of said check valve, an air conduit extending from said recess in communication with said inlet end of said check valve, an air pump connected to one end of said conduit for sequentially applying positive and negative air pressure through said conduit to open said check valve under said positive pressure and to close said valve under said negative pressure, said pump including a hollow casing forming a working chamber, electrical resistance means in said casing and energizable for heating and expanding the air in said chamber to produce said positive pressure in said conduit and de-energizable for cooling and contracting the air in said chamber to produce said negative pressure in said conduit, and a vent connected to said casing for exhausting air to the atmosphere from said chamber under said positive pressure and for permitting atmospheric air to enter said chamber under said negative pressure, switch means for energizing and de-energizing said electrical resistance means, a normally open and de-energized, electrically operated test valve connected to said conduit between said pump and check valve and energizable for closing said conduit to maintain said negative pressure therein, switch means for energizing said test valve upon de-energization of said electrical resistance means, and a gauge connected to said conduit on the side of said test valve remote from said pump for indicating whether the resistance of said check valve to opening under said positive pressure falls within predetermined minimum and maximum values and whether any air leaks through said check valve into said conduit under said negative pressure, said gauge including means movable in response to said positive pressure and in response to any decrease in said negative pressure, and electrical means energizable in response to the movement of said movable means under said positive pressure for indicating both said minimum and maximum values.

7. A check valve tester comprising a socket having a through bore for receiving the inlet end of a check valve and resilient rings in said bore forming an air tight seal with the exterior of said check valve, an air conduit extending from said bore in communication with said inlet end of said check valve, an intermittently operating air pump connected to one end of said conduit for applying positive air pressure through said conduit to open said check valve, said pump including a hollow casing forming a working chamber, an electrical resistance filament in said casing and energizable for heating and expanding the air in said chamber to produce said positive pressure in said conduit, and a vent connected to said casing by said conduit and having a resistance orifice for slowly exhausting air to the atmosphere from said chamber under said positive pressure, a manually closed switch for energizing said filament, and a gauge connected to said conduit for determining whether the opening pressure of said check valve under said positive pressure falls within predetermined minimum and maximum values relative to a standard reference pressure, said gauge including a manometer tube directly connected to said conduit containing a fluid movable in response to said positive pressure, electric light means connected to said manometer and energizable upon contact with said fluid for indicating both said minimum and maximum values, and the outlet end of said check valve being open to said standard reference pressure.

8. A check valve tester comprising a socket having a through bore for receiving the inlet end of a check valve and resilient rings in said bore forming an air tight seal with the exterior of said check valve, an air conduit extending from said bore in communication with said inlet end of said check valve, an intermittently operating air pump connected to one end of said conduit for applying negative air pressure through said conduit to close said check valve, said pump including a hollow casing forming a working chamber, an electrical resistance filament in said casing and de-energizable for cooling and contracting the air in said chamber to produce said negative pressure in said conduit, and a vent connected to said casing by said conduit for permitting atmospheric air to enter said chamber under said negative pressure, a normally open switch for de-energizing said filament, a normally open and de-energized, electrically operated test valve connected to said conduit between said pump and check valve and energizable for closing said conduit to maintain said negative pressure therein, and a gauge connected to said conduit on the side of said test valve remote from said pump for indicating whether the resistance of said check valve to opening under said positive pressure falls within predetermined minimum and maximum values and whether any air leaks through said check valve into said conduit under said negative pressure, said gauge including a manometer containing a fluid movable in response to any decrease in said negative pressure.

9. A check valve tester comprising a socket having a through bore for receiving the inlet end of a check valve and resilient rings in said bore forming an air tight seal with the exterior of said check valve, an air conduit extending from said bore in communication with said inlet end of said check valve, an intermittently operating air pump connected to one end of said conduit for sequentially applying positive and negative air pressure through said conduit to open said valve under said positive pressure and to close said valve under said negative pressure, said pump including a hollow casing forming a working chamber, an electrical resistance filament in said casing and energizable for heating and expanding the air in said chamber to produce said positive pressure in said conduit and de-energizable for cooling and contracting the air in said chamber for producing said negative pressure in said conduit, and a vent connected to said casing by said conduit for exhausting air to the atmosphere from said chamber under said positive pressure and for permitting atmospheric air to enter said chamber under said negative pressure, a switch manually closed for energizing said filament and normally open for de-energizing said filament, a variable resistance connected between said switch and filament for correcting the energization of said filament, a normally open, electrically operated test valve connected to said conduit between said pump and check valve and energizable for closing said conduit to maintain said negative pressure therein, a switch manually closed for energizing said test valve following de-energization of said filament and normally open for de-energizing said test valve, and a gauge connected to said conduit on the side of said test valve remote from said pump for indicating whether the resistance of said check valve to opening under said positive pressure falls within predetermined minimum and maximum values and whether any air leaks through said valve into said conduit under said negative pressure, said gauge including a manometer containing a fluid movable in response to said positive pressure and in response to any decrease in said negative pressure, and electric light means connected to said manometer and energizable on contact with said fluid for indicating both said minimum and maximum values.

References Cited in the file of this patent

UNITED STATES PATENTS

| | | |
|---|---|---|
| 277,756 | Lunkenheimer | May 15, 1883 |
| 1,106,907 | Wilkinson | Aug. 11, 1914 |
| 2,150,050 | Chilowsky | Mar. 7, 1939 |
| 2,270,447 | Jones | Jan. 20, 1942 |
| 2,430,122 | Grace | Nov. 4, 1947 |
| 2,449,556 | Kirkley | Sept. 21, 1948 |
| 2,465,685 | Henderson | Mar. 29, 1949 |
| 2,533,712 | Campbell | Dec. 12, 1950 |
| 2,608,854 | Gambrill | Sept. 2, 1952 |
| 2,707,390 | Beretish | May 3, 1955 |
| 2,738,669 | Silverman et al. | Mar. 20, 1956 |
| 2,853,874 | Mennesson | Sept. 30, 1958 |
| 2,855,777 | Garrett | Oct. 14, 1958 |
| 2,872,806 | Mamzic | Feb. 10, 1959 |

FOREIGN PATENTS

| | | |
|---|---|---|
| 669,211 | Germany | Dec. 10, 1938 |

OTHER REFERENCES

Electronics, vol. 23, issue 9, September 1950, pp. 96 to 101.